March 17, 1936.  R. D. SNIDER  2,034,156

DEVICE FOR THE HOUSING OF ANIMALS

Filed May 13, 1933  2 Sheets-Sheet 1

INVENTOR
Robert D. Snider
BY
Allen & Allen
ATTORNEY

March 17, 1936.    R. D. SNIDER    2,034,156
DEVICE FOR THE HOUSING OF ANIMALS
Filed May 13, 1933    2 Sheets-Sheet 2
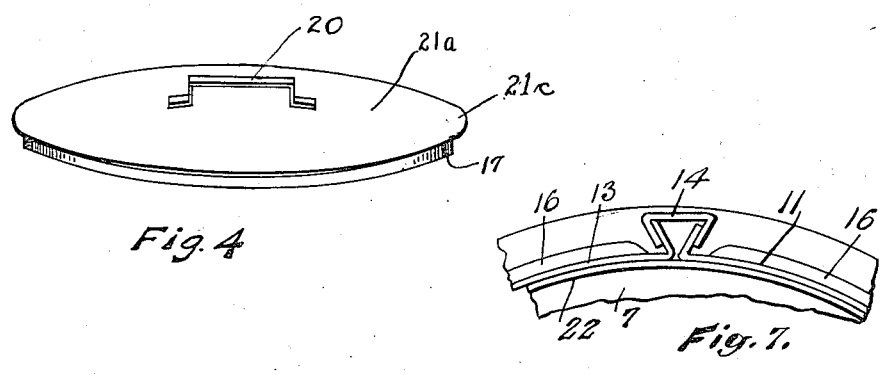
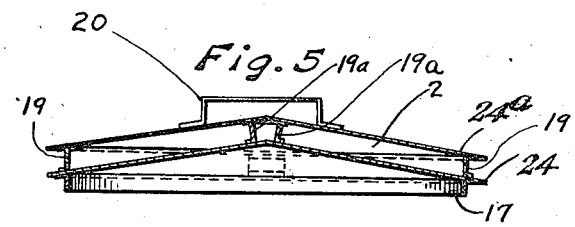
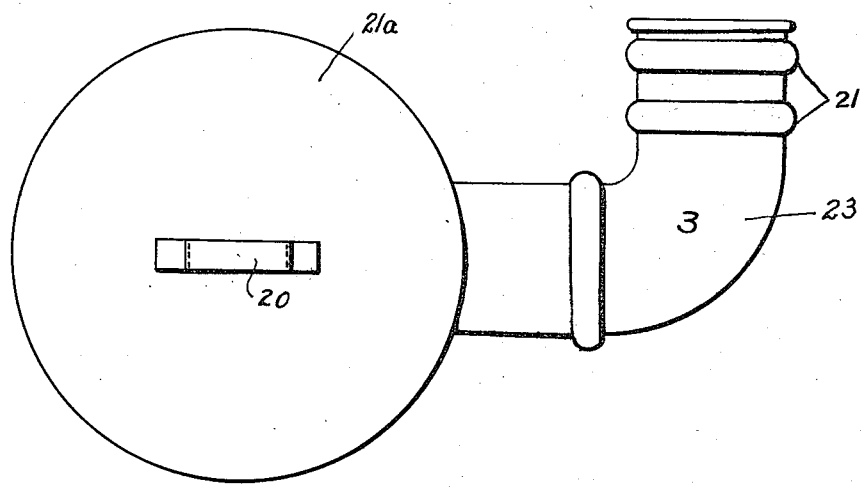
INVENTOR
Robert D. Snider
BY
Allen + Allen
ATTORNEY Patented Mar. 17, 1936

2,034,156

UNITED STATES PATENT OFFICE 2,034,156

DEVICE FOR THE HOUSING OF ANIMALS

Robert D. Snider, West Middletown, Ohio, assignor to The American Rolling Mill Company, Middletown, Ohio, a corporation of Ohio Application May 13, 1933, Serial No. 670,931

2 Claims. (Cl. 119—15)

Among the fur bearing animals which are sometimes bred in captivity may be mentioned the fox, muskrat, skunk, beaver, badger, opossum, mink, martin, otter, fisher, raccoon; and it is intended that the device herein shown and described, with slight changes, may be used for the propagation and hibernation of any of the above named animals.

The specific device shown in the drawings and described in the specification, however, for illustrative purposes only, is applicable to and of a size suitable for the propagation and breeding of foxes on ranches and farms adapted for that purpose.

Heretofore foxes and other fur-bearing animals have been propagated on ranches in dens generally built of wood and placed above the ground within a pen or enclosure. Foxes housed in dens above ground acquire what is termed in the trade a "rust" color in the fur, which is very objectionable from a sales and quality standpoint. These wooden dens also develop rough corners and edges in use, thus tearing the pelt and resulting in what is usually called by those skilled in the art of rearing foxes, a "rubbed fur".

It is the main object of this invention to eliminate both of these objectionable characteristics, and to provide a means for producing clear colored pelts, with natural guard hair.

In my experience I have dug out many wild fur-bearing animals, and particularly foxes, and have generally found the entrance tunnel to the den to be sloped upward to give drainage, and having a twelve inch sharp drop to the floor of the den or nest. The fox's natural instinct teaches him to make his burrow in this way for the purpose of excluding direct light, water, etc., and to keep the cubs within the nest until they are able to take care of themselves. A wild fox, not raised under artificial conditions, usually possesses a clear-colored, heavy pelt; and it is my intention by this invention to facilitate the production of pelts of exactly the kind and texture of the wild fox, in foxes bred under ranch conditions.

Among other objects, I provide a fox den, which is simple in construction, not liable to need repairs, will withstand the elements, is easy to keep in a sanitary condition, in which the temperature may be controlled, which is arranged so that the cubs cannot leave the nest until they are old enough, and which by its construction and the material from which it is made, will last over a period of several seasons instead of having to be rebuilt or replaced frequently.

My device or den is placed outside the regular enclosure for captivated animals, so as to make it easily accessible for the usual attentions necessary in caring for the animals. The den being buried outside or in the aisles between the pens, instead of inside the regular enclosure, not only is more accessible to the attendants, but allows about ten square feet more exercising space in the enclosure. Also, the owner of a number of these units may wish to move his entire ranch to another distant location, and by my composite unit construction, time and labor are saved when this is done.

My device comprises a container forming the den proper, and a runway or entrance tunnel attached thereto. Preferably the den is circular in cross-section and is made of sheet metal. The runway is attached to the den at a point above the floor, and slants downwardly from the den. The den is provided with a removable cover to permit cleaning.

The den is preferably buried about one-half of its height into the earth, and the dirt excavated from the hole and any additional dirt needed is banked up around the sides of the lid rim. The den is thus well insulated and is warm in winter and cool in summer, an ideal condition for this type of animal.

These and other objects of my invention which will be set forth hereinafter, or will be apparent to one skilled in the art upon reading these specifications, I accomplish by that certain construction and arrangement of parts of which I shall now describe a preferred embodiment. Reference is now made to the drawings which form a part hereof, and in which—

Figure 4 is a perspective of the lid or covering of the den.

Figure 5 is a perspective of a section of an insulated lid or cover.

Figure 6 is a top plane view showing my den, with another form of runway.

Figure 7 is an enlarged view of the dovetail joint between the members 10 and 14 of Fig. 3.

Figure 1:
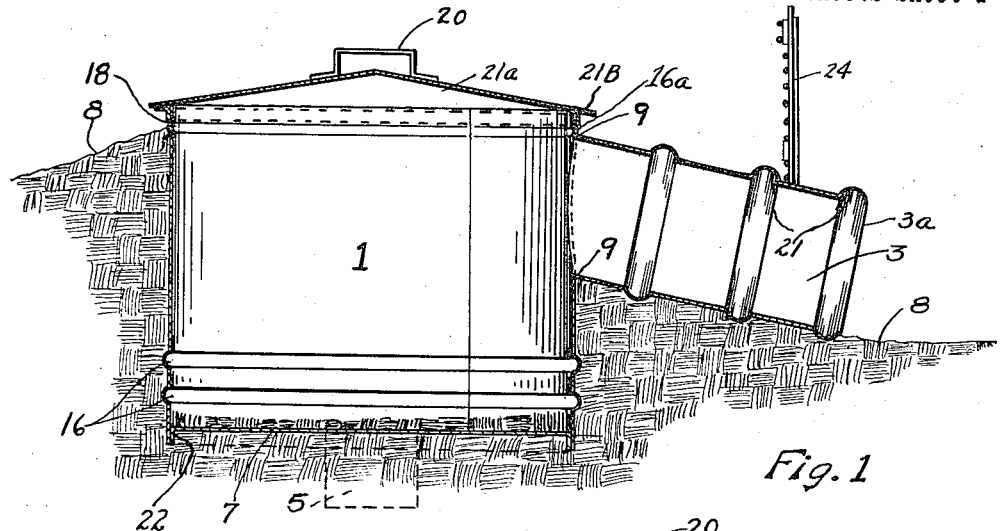
Figure 1 is a vertical section of my improved den in its natural position in the earth, ready for use, taken on the line 1—1 of Fig. 2.
Figure 2:
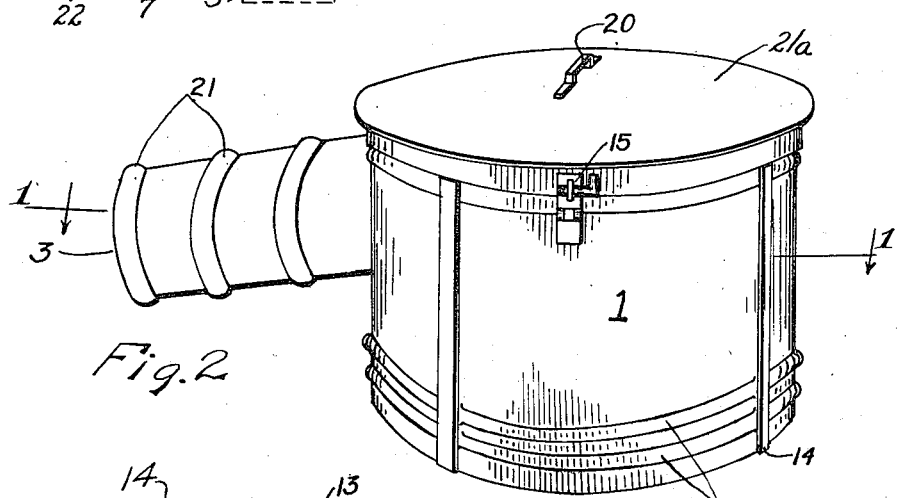
Figure 2 is a perspective of my den, complete and ready to be placed in the ground.
Figure 3:
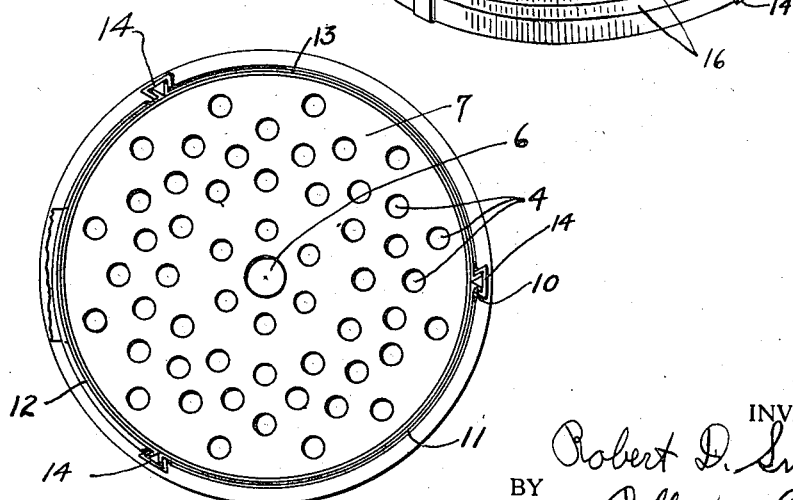
Figure 3 is a bottom plan view of the den showing the bottom construction.

Briefly, in the practice of my invention I provide a cylindrical shaped den 1, preferably made of galvanized metal, with a cylindrical shaped corrugated runway or entrance 3 communicating with the den 1, and welded thereto at the line 9—9 and so positioned as to enter the den 1 at a position near its top. The runway 3 is slanted so that the entrance-way 3a is substantially lower than the point of juncture with the den. The runway 3 may be transversely corrugated, as at 21, in order to insure a foothold for the animal entering the den. The den proper, 1, may have corrugations 16 and 16a for the purpose of strengthening it, and for other purposes to be explained later.

There is a removable cover 21a, with overhanging eaves 21b. This cover is circular in configuration and built substantially conical in shape, so as more readily to shed water. There is an annular flange 17 fastened to the bottom portion of the cover, and within the eaves, which fits within or over the top of the cylindrical den proper. There is a handle 20 fastened to the top of the cover to assist in its removal, and latches 15, preferably in the form of a hasp and staple, for fastening the cover to the den 1.

The bottom portion or floor of the den comprises a metal disc 7, with an annular flanged edge 22, and of such diameter as to fit snugly within the cylindrical wall portion 1. In some cases it may be found beneficial to make the bottom portion 7 of wire netting in preference to sheet metal. The floor 7 has numerous small holes 4 to allow the animals to come in direct contact with the elements of the soil, and a larger opening 6 in the center, the purpose of which will be described later.

In order to facilitate the shipping and transportation of my novel den, I preferably form the sides of a plurality of panels 11, 12 and 13, which are bent in the form of an arc, with a radius slightly larger than the radius of the completed den. The adjacent edges of these panels are partly bent back upon themselves, as at 10, in order to form a projecting hook-shaped flange. I provide a dove tail shaped channel 14 which may be slid down over the flanges 10 of adjacent panels in order to hold the walls 1 in place. Due to the fact that the radii of the arcs forming the panels are slightly larger than the radius of the finished den, there is a tendency for these panels to spring apart, which tendency forces them against the walls of the dovetail channel 14, and makes a very firm structure.

The floor piece 7 is slipped within the walls, with the edge of the flange 22 registering with the lower edge of the walls 1. This floor piece may be kept in position by friction alone, or it may be preferable to insert bolts and nuts through the flange 22 and the adjacent edge of the walls.

In erecting my novel den, a hole is dug in the ground, preferably on the outside of the fox pen, to a depth approximately one-half of the height of the den walls. The den is assembled and lowered into this hole, with the entering runway 3 projecting through the pen fence 24 and into the interior of the pen. The slope of the entrance runway 3 is such that the entrance 3a will be approximately at ground level. The ground removed from the hole is packed around the outside of the walls in order to insulate the den and keep it cool in summer and warm in winter. I have found it preferable to place some loose earth within the den and on top of the floor 7, in order to make a softer bedding for the nest; and I have also found it sometimes advisable to place a small can 5 beneath the hole 6 in the floor 7, and to fill this can with sulphur which disseminates into the interior of the den and improves the fur of the foxes. The lower corrugations 16 in the walls 1 assist the circulation of the air within the den when the foxes crowd too closely to the walls. These corrugations are flattened at the turned back edges of the panels 11, 12 and 13 in order to permit the use of the dovetail channel 14.

In Figure 5 I have illustrated an insulated cover or top for the den, particularly for use in hot climates where the sun beats down on the cover and has a tendency to raise the temperature in the den excessively. This cover is composed of the outer and inner covers 24 and 24a which are fixedly spaced apart by flanged hoops 19 and 19a. These hoops form a dead air space 2 between the two covers, which greatly adds to the insulating quality of the cover. I may prefer to fill this space 2 with some insulating material, such as cork or asbestos, and I may preferably paint the top of the cover 24 with some reflecting paint, such as aluminum paint or other material well known in the art of insulation. I find that with this cover I can lower the temperature within my den more than ten or twelve degrees.

In Figure 6 I have illustrated another form of entrance runway. In this form I provide an elbow 23 within the passageway. This tortuous passageway greatly reduces the tendency for the wind to enter the den in cold weather, and is exceptionally useful in cold climates. It is also very useful when housing shy animals, as it prevents the sunlight from entering the den, and permits the animal to hide himself from his enemies or anything which may startle him.

It will be apparent from the above description that I have provided a den which fulfills the functions of the natural den built by foxes and other wild animals in their natural habitat, and which has a slanting passageway to assist drainage, and an abrupt drop into the den itself so that the little foxes cannot get out of the den until they are large enough to take care of themselves.

My novel den has a top which may be quietly removed for inspection of the foxes without in any way disturbing them, and which is extremely useful when cleaning the den. The overhanging eaves 21c prevent water from running into the dovetail channel 14 and thereby dampening the inside of the den. The holes 4 in the floor permit the beneficial action of the minerals in the earth on the foxes' coats. I have also found that painting the inside of the den with pine tar assists very greatly in keeping the foxes in condition and thereby strengthening their coats.

With the use of my novel den it is possible to greatly increase the propagation of foxes, since it so nearly approaches their natural habitat and removes the irritating and exciting influence of captivity. All the corners are smoothly rounded and finished, so that there is no tendency for the coats of the animals to be torn; and the snug construction of the den greatly promotes contentment amongst the animals, which necessarily greatly improves their coats.

While I have shown and described my invention as relating to fox breeding and propagation, I do not desire to limit my invention to this one use, as it is easily susceptible and adaptable with slight changes in size and design, for the propagation of any of the fur-bearing animals named in this specification and for other uses.

It is understood that different forms of my preferred form may be made without departing from the spirit of my invention, and that with minor changes, which will readily suggest themselves to those skilled in the art, my device may be used as a brooder for hens, turkeys, and other birds.

Having thus described my invention, what I claim as new and desire to secure by Letters Patent, is:—

1. The combination of a fox den and a fox enclosure, comprising a cylindrical metal den substantially buried in the earth without said enclosure, said den having a removable top and a foraminated bottom, a cylindrical transversely corrugated runway entering said den at a point above the bottom and extending downwardly and into the enclosure, so that a fox may leave the enclosure by running up the runway and dropping into the den.

2. A fox den comprising a cylindrical wall portion consisting of a plurality of arcuate shaped metal panels having outwardly bent contiguous edges, said panels being held in the form of a cylinder by dovetailed channels engaging said edges, a floor portion positioned within said cylinder and containing apertures for drainage, a roof portion removably positioned on the top of said wall portion, an entrance passage comprising a cylinder containing a plurality of corrugations, one end of said passage piercing said wall at a point near the top, and the other end of said passage being at a lower elevation than said first mentioned end.

ROBERT D. SNIDER.